(12) United States Patent
Noma (10) Patent No.: US 8,271,371 B2
(45) Date of Patent: Sep. 18, 2012

(54) COMPUTERIZED METHOD FOR GENERATING AND MAINTAINING A LEVERAGED OR REVERSE EXCHANGE TRADED PRODUCT

(75) Inventor: Elliot Noma, Metuchen, NJ (US)

(73) Assignee: Garrett Asset Management, LLC., New York, NY (US)

( * ) Notice: Subject to any disclaimer, the term of this patent is extended or adjusted under 35 U.S.C. 154(b) by 76 days.

(21) Appl. No.: 12/924,675

(22) Filed: Oct. 1, 2010

(65) Prior Publication Data

US 2012/0084229 A1    Apr. 5, 2012

(51) Int. Cl.
    *G06Q 40/00* (2012.01)
(52) U.S. Cl. .......................................... 705/36
(58) Field of Classification Search ............. 705/36
     See application file for complete search history.

(56) References Cited

U.S. PATENT DOCUMENTS

| | | | |
|---|---|---|---|
| 7,831,497 B2 | 11/2010 | O'Neil | |
| 2005/0049952 A1* | 3/2005 | Carter | 705/36 |
| 2008/0215499 A1 | 9/2008 | O'Neil | |
| 2011/0047099 A1 | 2/2011 | O'Neil | |
| 2011/0191234 A1* | 8/2011 | Kiron | 705/37 |

* cited by examiner

*Primary Examiner* — Charles Kyle
*Assistant Examiner* — Clifford Madamba
(74) *Attorney, Agent, or Firm* — Davidson, Davidson & Kappel, LLC.

(57) ABSTRACT

A computer implemented method for maintaining a leveraged or reverse exchange traded product is provided which includes electronically monitoring, with a computer, a change in value of a product sold on an exchange, ECN, or ATS; and calculating, with a computer, a leverage ratio, wherein the leverage ratio is $dg(r)/dr = c(1+r)^{c-1}$, and wherein r is a current cumulative return of the product during a current trading day, and c is a constant, and wherein the leverage ratio is equal to the number of underlying shares required to provide the target return with respect to one share of the product.

12 Claims, 7 Drawing Sheets

| open | last | underlying return | Underlying fund cum return | leverage | Variable Leverage fund According to the Invention leveraged return | cum returns leveraged | cum return ratio | power leverage | Ideal leveraged fund ideal vs variable leveraged fund |
|---|---|---|---|---|---|---|---|---|---|
| 110 | 110 | | 1 | | | | | | |
| 111 | 111 | 1.009090909 | 1.009090909 | 1.9129 | 1.01739 | 1.01739 | 1.01739 | 1.017462142 | 1.000075638 |
| 112 | 112 | 1.009009009 | 1.018181818 | 1.928769066 | 1.017376298 | 1.035063472 | 1.035063472 | 1.035066491 | 1.000003018 |
| 113 | 113 | 1.008928571 | 1.027272727 | 1.944625885 | 1.017362729 | 1.053040035 | 1.053040035 | 1.052818935 | 0.999789898 |
| 114 | 114 | 1.008849558 | 1.036363636 | 1.960469978 | 1.017349292 | 1.071309585 | 1.071309585 | 1.070713362 | 0.999443464 |
| 115 | 115 | 1.008771193 | 1.045454545 | 1.976303262 | 1.017335863 | 1.089888179 | 1.089888179 | 1.088751660 | 0.998963074 |
| 116 | 116 | 1.008695652 | 1.054545455 | 1.992122054 | 1.017322054 | 1.108761585 | 1.108761585 | 1.106833727 | 0.998261433 |
| 117 | 117 | 1.008620689 | 1.063636364 | 2.007930088 | 1.017309742 | 1.127953972 | 1.127953972 | 1.125259446 | 0.997611139 |
| 118 | 118 | 1.008547009 | 1.072727273 | 2.023726218 | 1.017296805 | 1.147463972 | 1.147463972 | 1.143728714 | 0.996744771 |
| 119 | 119 | 1.008474576 | 1.081818182 | 2.039510612 | 1.017283868 | 1.167296726 | 1.167296726 | 1.162341422 | 0.995875489 |
| 120 | 120 | 1.008403361 | 1.090909091 | 2.055283350 | 1.017271268 | 1.187457445 | 1.187457445 | 1.181097467 | 0.994664037 |
| 119 | 119 | 0.991666667 | 1.081818182 | 2.071044566 | 0.982741295 | 1.166883467 | 1.166883467 | 1.162341422 | 0.996135755 |
| 118 | 118 | 0.991596639 | 1.072727273 | 2.055263359 | 0.982728711 | 1.146806304 | 1.146806304 | 1.143728714 | 0.997314468 |
| 117 | 117 | 0.991525424 | 1.063636364 | 2.039516612 | 0.982716012 | 1.126690708 | 1.126690708 | 1.125259446 | 0.998467034 |
| 116 | 116 | 0.991452991 | 1.054545455 | 2.023726218 | 0.982703195 | 1.107493803 | 1.107493803 | 1.106833727 | 0.999404285 |
| 115 | 115 | 0.991379310 | 1.045454545 | 2.007930088 | 0.982690258 | 1.088323372 | 1.088323372 | 1.088751660 | 1.000393533 |
| 114 | 114 | 0.991304348 | 1.036363636 | 1.992122054 | 0.982677201 | 1.069470663 | 1.069470663 | 1.070713362 | 1.001162070 |
| 113 | 113 | 0.991228070 | 1.027272727 | 1.976303262 | 0.982664017 | 1.050893023 | 1.050893023 | 1.052818935 | 1.001797165 |
| 112 | 112 | 0.991150442 | 1.018181818 | 1.960469978 | 1.982650708 | 1.032697344 | 1.032697344 | 1.035066491 | 1.002298071 |
| 111 | 111 | 0.991071429 | 1.009090909 | 1.944625885 | 0.982637271 | 1.01476899 | 1.01476899 | 1.017462142 | 1.002655921 |
| 110 | 110 | 0.990990991 | 1 | 1.928769066 | 0.982623702 | 0.997134008 | 2.591466+03 | 1 | 1.002874230 |

COMPUTERIZED METHOD FOR GENERATING AND MAINTAINING A LEVERAGED OR REVERSE EXCHANGE TRADED PRODUCT

FIELD OF THE INVENTION

The present invention relates to the field of computer implemented processes for creating and maintaining a leveraged or reverse exchange traded product.

BACKGROUND OF THE INVENTION

An exchange-traded fund (ETF) or, more generally, an exchange traded product (ETP), is an investment fund that is traded on stock exchanges, electronic communication networks (ECNs), and/or alternative trading systems (ATS). Most ETPs track an index, such as the S&P 500. More generally, an ETP holds assets (e.g., stocks, bonds, commodities) and is designed to trade at approximately the same price as the net asset value of these underlying assets over the course of the trading day.

An advantage of an ETP is that it combines the diversified holdings of a mutual fund, which can be bought or sold only at the end of each trading day for its net asset value, with the ability to trade throughout the trading day at prices that track the net asset value.

Over time, new types of ETPs have been developed. These include leveraged and reverse ETPs which promise investors returns that are multiples of the index return or are returns that are the negative of the index returns. Leveraged and reverse ETPs can either be daily or monthly. The daily ETPs target a specified multiple of the daily return of the underlying instrument and the monthly ETPs target a specified multiple of the monthly return of the underlying instrument. However, these ETPs may not, in fact, track the specified multiple of the index performance over a period of time.

SUMMARY OF THE INVENTION

In accordance with an embodiment of the present invention, a computer implemented method is provided for managing a leveraged or reverse exchange traded product. The method includes electronically monitoring, with a computer, a change in value of a product sold on an exchange, ECN, or ATS. The product, may, for example, be an ETP sold on an exchange. The method further includes calculating, with a computer, a target number of shares in the product required to provide a target return that is one of a multiple of a return of the product, a negative of the return of the product, or a negative multiple of the return of the product, where the target number of shares changes as a function of the monitored change in value of the product during a trading day. The method may further comprise the step of buying or selling shares in the product to obtain the target number of shares, and/or displaying the target number of shares to a user.

In accordance with further embodiments of the present invention, the step of calculating further includes calculating a leverage ratio, wherein the leverage ratio is $dg(r)/dr=c(1+r)^{c-1}$, and wherein r is the current cumulative return of the product during a trading day, and c is a constant, and wherein the leverage ratio is equal to the number of underlying shares required to provide the target return with respect to one share of the product. Preferably, $c=1.9129$ when the target return is a two times multiple of the return of the product (e.g., to provide a two-times leveraged fund), and $c=-0.9512$, when the target return is a negative of the return of the product (e.g., to provide an inverse leveraged fund). In such an example, the leverage ratio would be $1.9129(1+r)^{1.9129-1}$ to provide a two times leveraged fund, wherein r is the cumulative return for the product for that day. As the value of the product changes during the course of the day, the cumulative return r will change, changing the leverage ratio. In response to the change in leverage ratio, the user will buy or sell the product to match the ratio.

The information provided by this computer implemented method is also important when calculating the number of shares to be issued in the leveraged or reverse ETP in exchange for delivery of a fixed number of shares of the underlying product. For example, the price of an ETP is stabilized to approximate that of the index (or in the case of the leveraged or reverse ETP to the stated leverage) by the sponsor offering to buy or sell the underlying product or underlying basket of products at specified conversion rate. At any time, a market participant can deliver the underlying product or basket of products and ask to receive a pre-specified number of shares of the ETP. Also, the market participant can redeem shares of the ETP and take delivery of a pre-specified number of shares of the underlying product or basket. To implement this, potential market participants need to know the leverage factor computed by the computer implemented method so they can determine if there is an arbitrage opportunity to either deliver the unlevered product and receive shares in the leveraged or reverse ETP or redeem shares of the leveraged or reverse ETP and receive shares of the underlying product.

In accordance with another embodiment of the present invention, a computer implemented method for maintaining a leveraged or reverse exchange traded product is provided which comprises: electronically monitoring, with a computer, a change in value of a product sold on an exchange, ECN, or ATS; and calculating, with a computer, a leverage ratio, wherein the leverage ratio is $dg(r)/dr=c(1+r)^{c-1}$, and wherein r is a current cumulative return of the product during a current trading day, and c is a constant, and wherein the leverage ratio is equal to the number of underlying shares required to provide the target return with respect to one share of the product.

As explained in more detail below, unlike conventional leveraged and reverse funds, the returns on the funds in accordance with the embodiments of the present invention are substantially unaffected by the specific path of returns for the underlying fund and will generate substantially the same returns regardless of the specific sequence of returns, time period, timing or volatility of the returns of the underlying fund.

An important feature from a trading perspective is that rebalancing is done during the trading day in accordance with the embodiments of the present invention. The advantage is that the investor does not need to actively manage the size of the position to maintain a target amount of exposure since the product returns the same results regardless of the specified sequence of returns, time period, timing or volatility of the returns of the underlying fund. Furthermore, unlike the monthly leveraged and reverse ETPs, the recent performance of the underlying product has no residual effect on how the leveraged or reverse ETP will perform in the future relative to the underlying product which requires and adjustment in the initial amount invested. This means that for a given leverage constant, c, a single table can describe the relationship of the returns of the leveraged or reverse ETP as a function of the return of the underlying product regardless of the time frame of the holding period, or the recent performance of the underlying instrument.

In accordance with an another embodiment of the present invention, a computerized method for structuring leveraged and reverse exchange products is provided. The method comprises generating a leveraged or reverse exchange traded product that provides a predictable return that is a well defined function of a return of an underlying unleveraged instrument. The leveraged or reverse traded product allows an investor to receive a levered or inverse return relative to the return of the underlying instrument. The method further includes selling, using a computer, the leverage or reverse exchange traded product on an exchange, ECN, or ATS.

In according with yet another embodiment of the present invention, a computerized method for generating a leveraged or reverse exchange index is provided. The method comprises generating, using a computer a leveraged or reverse exchange traded index that provides a predictable return that is a well defined function of a return of an underlying unleveraged instrument. The index allows the investor to receive a levered or inverse return relative to the return of the underlying instrument. The method further includes selling, using a computer, the leverage or reverse exchange traded product on an exchange ECN or ATS, based on said index

BRIEF DESCRIPTION OF THE DRAWINGS

The invention and its advantages will be better understood on reading the following description which is given purely by way of example and with reference to the appended drawings, in which:

FIG. 5 is a chart that compares the performance, over twenty ticks, for an underlying ETP, a variable leveraged ETP, and an idealized power leveraged ETP.

DETAILED DESCRIPTION OF A PREFERRED EMBODIMENT

As noted above, leveraged and reverse ETP's may not, in practice, track the value of the underlying fund during a period of time. As explained above, leveraged and reverse ETPs allow investors the opportunity to gain levered returns or hedge their portfolio exposures while satisfying certain portfolio constraints such as the use of leverage or the requirement for long-only investments. Currently, most leveraged ETPs offer returns that are either 2 times or 3 times the daily returns of the underlying index. Most reverse ETPs offer returns that are either −1, −2 or −3 times the daily returns of the underlying index. As such, on a day when the index returns 1 percent, the 2 times leveraged ETP would return 2 percent on the principal and the two-times reverse ETP would return −2 percent. However, over several days, the cumulative returns from the leveraged ETP may deviate from the originally specified multiple of the underlying index.

For instance, assume an investor is invested in an index that returned 10% in the first day and then declines 9.0909 . . . % in the second day. Over the two day period, the index has neither a gain nor a loss.

If a second investor holds a two-times leveraged ETP, that investor would receive a 20% gain in the first day followed by an 18.1818 . . . % decline in the second day. This results in a 1.81818 . . . % decline over the two days:

$$(1+0.20)(1-0.181818)=0.981818=1-0.0181818$$

The leveraged ETP thus underperforms the index in this case. In other cases, the leveraged ETP can outperform the index return times two.

The example above illustrates how a leveraged ETP is sensitive to the changes in the direction of returns. Each change in direction lowers the return when compared to the return if the index times two. When the index moves in a consistent direction, the leveraged ETP will outperform the index times two. Mathematically, we can see this by assuming that the index returns a % in day one and b % in day two. Therefore:

the index return in these two days is $$\text{Index-two-day-return}=(1+a)(1+b)=1+(a+b+ab); \text{ and}$$

the two-times leveraged ETP returns:

$$\text{Leveraged-ETP-two-day-return}=(1+2a)(1+2b)=1+2(a+b)+4ab=1+2(a+b+ab)+2ab$$

If a and b are the same sign, then the leveraged ETP outperforms twice the index. If a and b have opposite signs, then the leveraged ETP underperforms twice the index. In other words, reversals hurt the performance of the leveraged ETP and continuations help performance. As a result, leveraged ETPs are exposed to directional changes so they are often recommended as tools to be traded within a day, but not held overnight or for the long term.

The mathematics for the reverse ETP is similar but show even a stronger sensitivity to volatility. In the index example above, the two-times reverse ETP has a 20% decline in day one followed by a 18.18 . . . % gain in day two. The cumulative two day return is a loss of 5.4545 . . . %:

$$(1-0.20)(1+0.181818)=0.94545=1-0.05454$$

Therefore, like to the two-times leveraged ETP, the two-times reverse ETP underperforms the index times two.

$$\text{Reverse-ETP-two-day-return}=(1-2a)(1-2b)=1-2(a+b)+4ab=1-2(a+b+ab)+6ab$$

The result is below the anticipated cumulative return when a and b are have different signs and above the anticipated cumulative return when a and b have the same sign.

Figure 1:
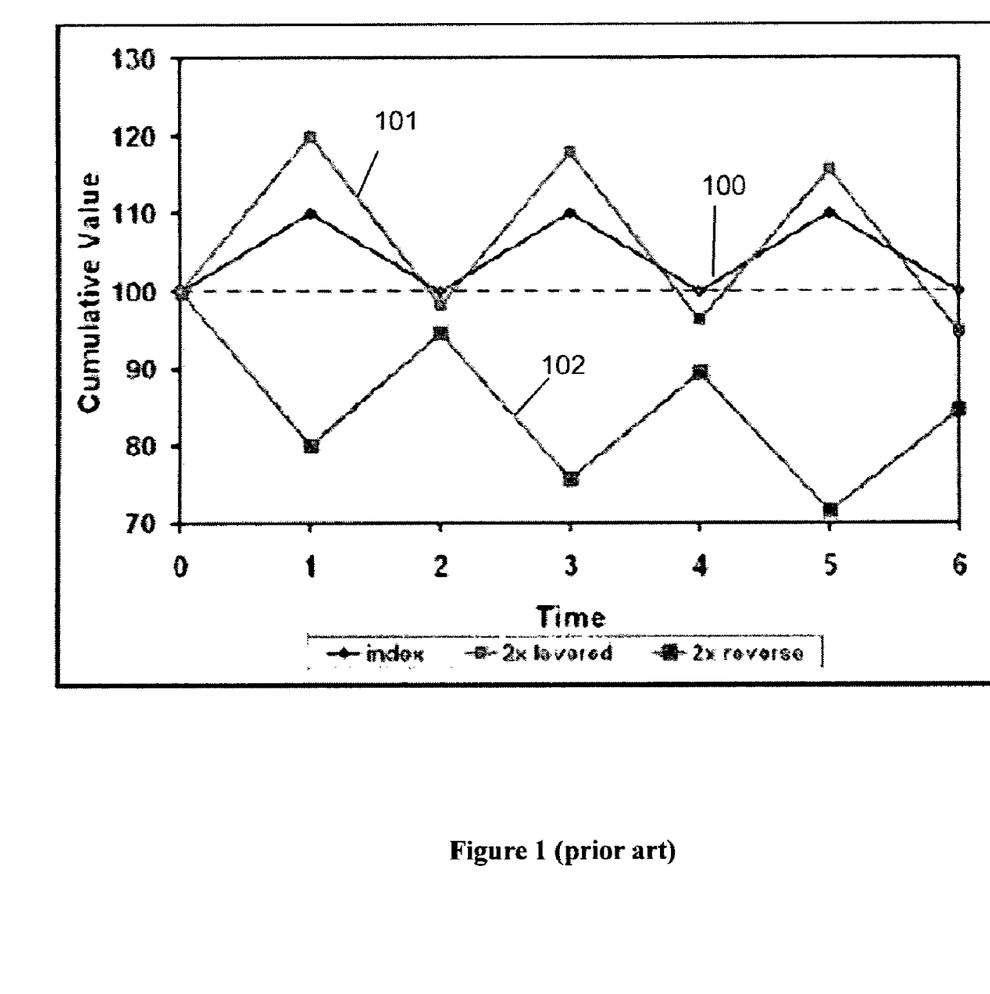
FIG. 1 is a graph that illustrates cumulative value over time for a hypothetical index, leveraged ETP, and reverse ETP.

FIG. 1 illustrates how repeated reversals can degrade the performance of the leveraged and reverse ETP. The figure plots cumulative value over time for an index 100, a leveraged ETP 101, and a reverse ETP 102, and illustrates that simply multiplying the daily returns creates an ETP whose returns track the index on a daily basis (times the leverage), but do not consistently track the index (times the leverage) over extended time periods.

Figure 2:
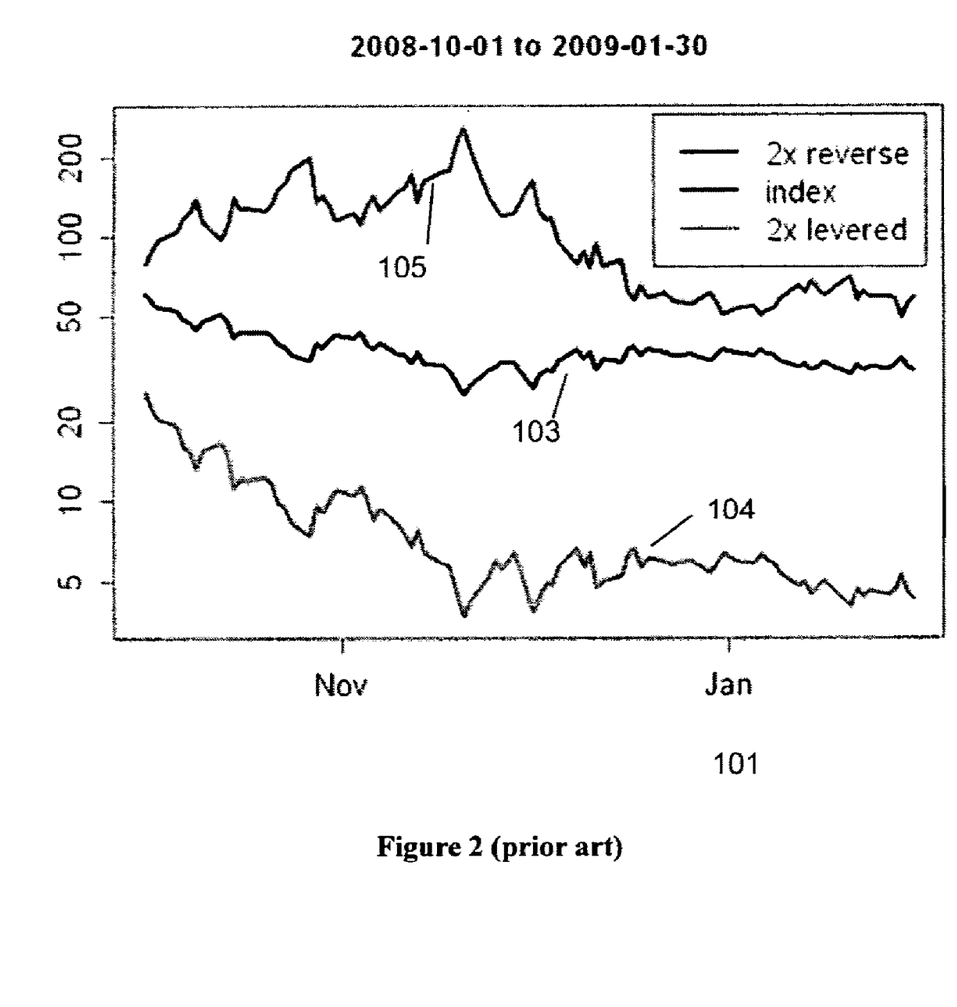
FIG. 2 is a graph that plots the actual cumulative value over time for three real estate ETPs: the Dow Jones U.S. Real Estate Index Fund (IYR), the ProShares Ultra Real Estate (URE), and the ProShares UltraShort Real Estate (SRS)

FIG. 2 illustrates of how a leveraged ETP and a reverse ETP can perform in a volatile market. This figure plots the actual cumulative value over time for three real estate ETPs: the Dow Jones U.S. Real Estate Index Fund (IYR)(index 103), the ProShares Ultra Real Estate (URE) (2 time levered 104), and the ProShares UltraShort Real Estate (SRS) (2 times levered inverse 105) respectively. All three are tied to the daily performance of the Dow Jones U.S. Real Estate Index. The illustrated period from October 2008 to February 2009 was a period of concerns about the real estate market accompanied by high market volatility. FIG. 2 shows how the three funds fared during that period. It is not surprising that both the index fund, (IYR 103) and the leveraged ETP (URE 104) suffered losses during the period. What is less intuitive is why the reverse ETP (SRS 105) profited during much of this period, but ultimately ended lower than at the start of the period.

Figure 3:
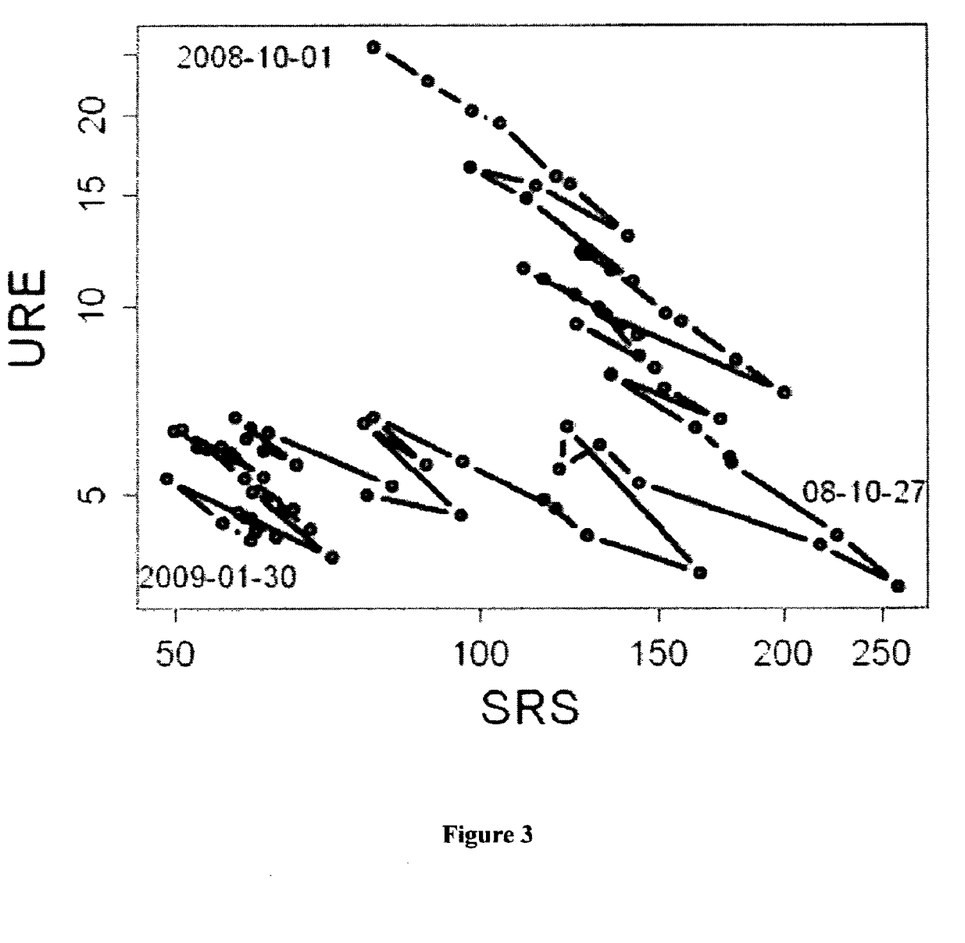
FIG. 3 is a graph that plots, over the same time period as FIG. 2, the daily prices for URE versus the price on the same day for SRS.

This was due to the large number of market reversals that took place during this period. Another way to examine how market reversals impacted the prices of the leveraged and reverse ETPs is to plot how their prices moved relative to each other during this time period. FIG. 3 plots the daily prices for the leveraged ETP (URE 104) versus the price on the same day for the reverse ETP (SRS 105). The points at the upper left corner of this graph indicate the prices for both ETPs at the start of the time period. The points at the lower right are the prices at the height of the crisis. The points at the lower left are the prices at the end of the period. Note that for any given short period of time, higher prices in the leveraged ETP are matched with lower prices for the reverse ETP as indicated by lines running from the upper-left to the lower-right or vice versa. However, each reversal in direction is accompanied by a general decrease in the prices for both ETPs. Over time this creates a sawtooth pattern that grinds down the prices for both funds.

The time period illustrated in FIGS. 2 and 3 was a period of high uncertainty with a large number of market reversals which hurt both the leveraged and the reverse ETPs. When the market is more directional, it is possible that both the leveraged and reverse ETPs would be helped by the market momentum. In either case, however, the funds can have large tracking errors with respect to the index they are following, even adjusting for leverage.

In accordance with the present invention, a computerized method is provided that creates funds that mirror the returns of other funds with leverage or inverse leverage. The funds are constructed so that positive returns on the underlying fund will generate positive returns on the leveraged fund and will generate negative returns on the inverse leveraged funds. A negative return on the underlying fund will generative negative returns on the leveraged fund and will generate positive returns on the inverse leveraged fund. Unlike the conventional leveraged and reverse funds discussed above, the returns on the funds in accordance with the embodiments of the present invention are not affected by the specific path of returns for the underlying fund and will generate substantially the same returns regardless of the time period, timing or volatility of the returns of the underlying fund.

Therefore, unlike conventional leveraged and reverse funds, the funds generated in accordance with the embodiments of the present invention are suitable to be held for extended periods of time to express an investor's view of the future performance of the underlying fund.

Leveraged and reverse exchange traded funds implementing embodiments of the present invention track an index that has been adjusted for leverage. The returns of the funds whether held for a day or an extended period of time are a simple function of the index return. A hedging methodology is employed in accordance with the present invention during the trading day to insure the leveraged or reverse ETP at closing tracks the index according to the stated formula. Prior to adjustment for fees, positive returns for the index within a day, over a day or an extended time period result in a positive return to the leveraged ETP. Similarly a negative index return will result in a negative return to the leveraged ETP. Leveraged and reverse ETPs using the methodology according to the present invention (unlike previous methodology) will be substantially insensitive to the timing of daily returns or the volatility of the underlying index.

The method for obtaining the leverage in accordance with the present invention can be implemented using trading of the underlying index, the constituents of the index, or other derivatives associated with the index. For example, instead of using the underlying index, the same return pattern could also be obtained by dynamically changing one's exposure to a product that is already leveraged. So, the leverage methodology for the proposed 1.9129 leveraged product relative to the unlevered underlying could be adapted to dynamically buy and sell the current 2× leveraged product in such a way as to create the same return stream as dynamically buying and selling the unlevered product. The same return stream could also be obtained by adapting the trading rules to actively buy and sell other derivatives such as options or swaps. Another way to create the same returns is to dynamically buy and sell the securities that underlying the unlevered index. So instead of buying 10,000 shares of the unlevered underlying ETF, the sponsor could buy the equivalent number of shares of the various securities in the index to obtain the same market exposure.

In accordance with an embodiment of the present invention, a computer program executing on a computer provides information used to determine the amount of leveraged or inverse leverage to be employed as the price of the underlying fund changes during the trading. The leverage is increased or decreased according to a fixed schedule. The computer program is designed so that that day's return for the index is translated into a target return for the leveraged fund as determined by a leverage ratio formula specific to the leveraged fund. The net asset value of the leveraged fund is targeted to a specific leverage ratio formula based on the value of the underlying fund. This leverage ratio formula is the same regardless of whether the time period is for intraday trading, day-to-day trading or for a long-term buy and hold strategy.

An important observation is that if the intraday leverage is adjusted so the intraday returns follow the leverage formula then all subsequent larger units of time (day, week, fortnight, month, etc.) will automatically satisfy the leverage ratio formula.

The general relationship between the return of the unlevered fund, r, and the return of the leveraged fund, r* is $$r^* = (1+r)^c - 1$$

where "c" is a constant that determines the leverage or inverse leverage of the leveraged fund. The constant "c" is fixed by specifying a target return for the leveraged fund, r'* and the corresponding return of the underlying fund, r' and applying the following formula:

$$c = \ln(1+r'^*)/\ln(1+r') \text{ where } \ln(x) \text{ is the natural logarithm of } x$$

The leverage ratio between the underlying fund and the leveraged fund will vary depending on the performance of the underlying fund. At the start of each trading day, the leverage ratio will be "c", the same constant that determining the mapping of the underlying returns to the levered returns. As the value of the underlying fund changes during the day, the intraday return, r, determines the leverage ratio $$\text{Leverage ratio} = c(1+r)^{c-1}$$

The techniques used in conventional leveraged and reverse ETP's can be used for funding the leverage, providing a secondary market, and providing all other functions needed to manage an exchange traded fund. As these techniques are conventional and well known to those of skill in the art, they will not be discussed in detail herein.

Set forth below is a table that might be presented to potential investors showing how the return of the leveraged ETP is related to the unlevered return of the underlying instrument for the proposed 2× leveraged product. The returns for the leveraged fund are calculated using c=1.9129 in the formula in paragraph 40.

| Instrument | Leveraged Return |
|---|---|
| −10.0% | −18.3% |
| −9.0% | −16.5% |
| −8.0% | −14.7% |
| −7.0% | −13.0% |
| −6.0% | −11.2% |
| −5.0% | −9.3% |
| −4.0% | −7.5% |
| −3.0% | −5.7% |
| −2.0% | −3.8% |
| −1.0% | −1.9% |
| 0.0% | 0.0% |
| 0.0% | 0.0% |
| 1.0% | 1.9% |
| 2.0% | 3.9% |
| 3.0% | 5.8% |
| 4.0% | 7.8% |
| 5.0% | 9.8% |
| 6.0% | 11.8% |
| 7.0% | 13.8% |
| 8.0% | 15.9% |
| 9.0% | 17.9% |
| 10.0% | 20.0% |

The leverage ratio described above is generated by a computer program performing the calculations set forth above. The program can be created in a variety of computer languages and the computer executing the program can access any one of many data feeds of market data for the underlying fund. As a non-limiting example, the calculations can be implemented using the Excel® computer program, distributed by Microsoft Corp., executing on a conventional computer, and the computer, executing Excel® can use a real-time feed from the Think or Swim® platform, currently available from TD Ameritrade.

In accordance with one embodiment, the return and leverage ratio are calculated automatically and displayed in real-time on an electronic display, such as a computer screen or PDA, as the market trades throughout the day. In accordance with a further embodiment of the present invention, the return and leverage ratio are displayed to a user, integrated into a electronic trading program, so that the user can use this information to both adjust the leverage as the market moved and publish the number of shares of the underlying ETP that would need to be delivered/redeemed to create/destroy a share of the leveraged ETP. For example, a user might not wish to buy/sell the underlying ETP with every price movement. In accordance with this embodiment of the present invention, the leverage ratio can be displayed to the user, and the user can choose to buy/sell the underlying asset to match the leverage ratio at his or her discretion.
The user may, for example, be the ETP sponsor or could be another market participant that wishes to arbitrage any differences between the price of the leveraged or reverse ETP and the underlying product.

In accordance with another embodiment, the return and leverage ratio are calculated automatically by the computer program as described above, and that program, or a separate program, automatically executes trading of the underlying ETP based on the leverage ratio to provide a leveraged or reverse ETP. In accordance with a further embodiment of the present invention, the program can accept, as user input, a percent change (or other change metric) in the underlying asset that will trigger buying/selling the underlying asset to match the leverage ratio. The program could also trigger buy and sell orders for constituents of the index or derivatives based on the index that could be used to create the identical exposures.

The method in accordance with the present invention will now be discussed in more detail. As outlined above, a leveraged ETP can track a levered index on a day-by-day basis, but fail to track the levered index returns over a longer time period. The cumulative return on the leveraged ETP depends on both the returns of the index and the path of returns of the index. In particular, the number of day-on-day reversals strongly influences the ability of the leveraged ETP to track the levered index, resulting in a long-term tracking error. In accordance with the method according to the present invention, this long-term tracking error is reduced by dynamically changing the leverage based on the index performance.

In a conventional two-times leveraged fund, the levered daily return, $r^*$, is a constant multiple of the daily index return.

$$r^*=2r$$

However, multiplying returns by a fixed value is not the only way to increase leverage. One alternative is to increase the returns by adjusting the daily return, r, using the power formula:

$$r^*=(1+r)^{1.9129}-1$$

which is equivalent to $$(1+r^*)=(1+r)^{1.9129}$$

Figure 4:
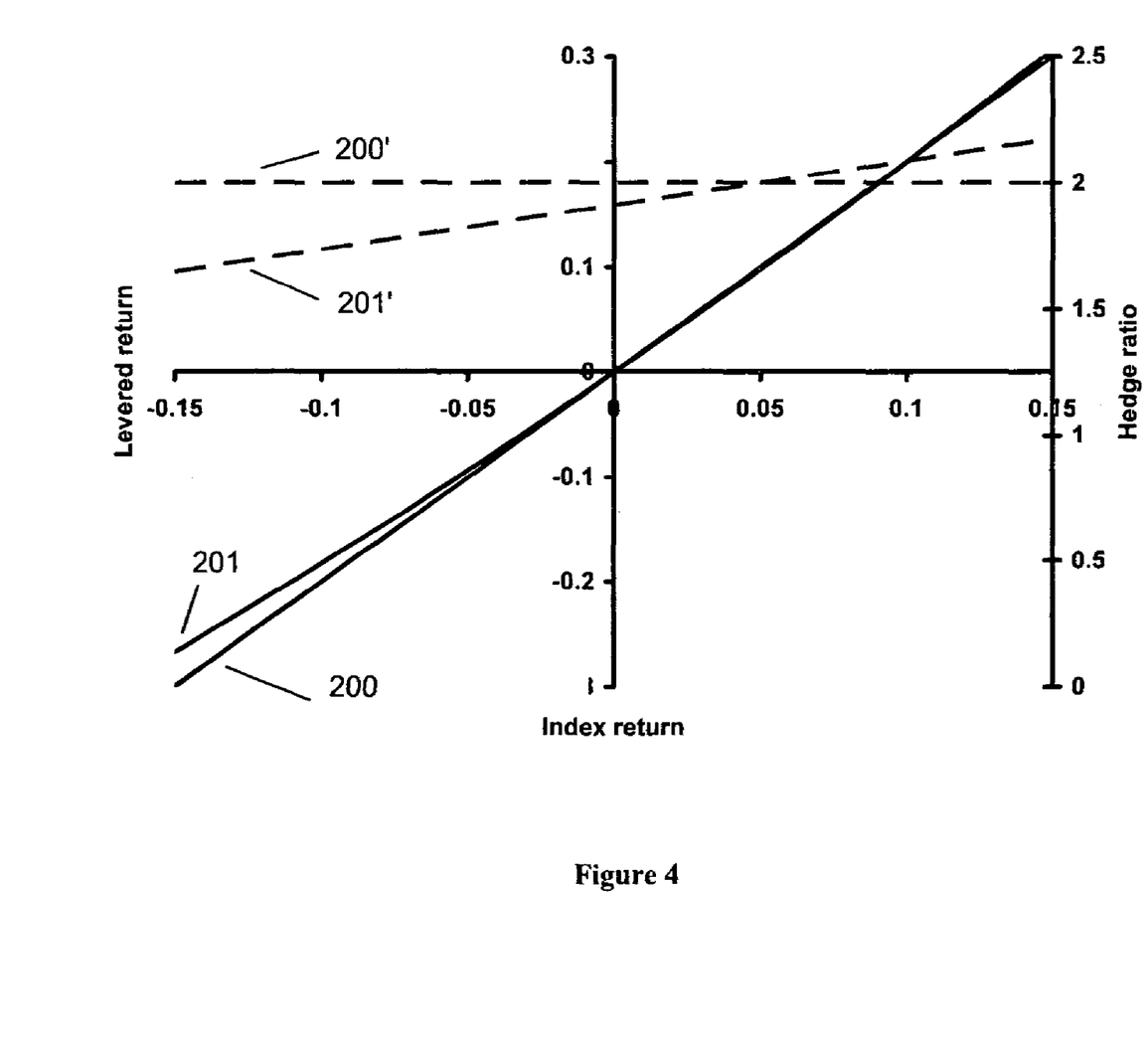
FIG. 4 is a graph that plots a levered daily return for a conventional multiple leveraged ETP against leveraged daily return of a variable leverage ETP according to an embodiment of the present invention.

FIG. 4 plots $r^*$ according a fixed two times levered function and according to the power function. The solid lines in the graph show how similar the power function is to the fixed two-times levered function. In FIG. 4, the solid lines show the leveraged return as a function of the intraday market return. Line 200 is the leveraged return for a fixed-two times leveraged fund. Line 201 is the leveraged return for the leveraged funds according to the power formula. When index returns are between 0% and 10%, the fixed, two-times leverage 200 returns exceed the power formula 201 returns. Outside that range, the power formula 201 returns exceed the two-times leverage 200 returns. The dashed lines in FIG. 4 show the leverage ratio as a function of the intraday market return. The dashed line 200' is the leverage ratio for the fixed two times leveraged fund. The dashed line 201' is for the leveraged funds according to the to an embodiment of the present invention, applying a leverage ratio of $dg(r)/dr=c(1+r)^{(c-1)}$, as discussed below.

Using the power function formula, $r^*=(1+r)^{1.9129}-1$, a 10% index return on day one is a 20% return on the leveraged fund and the 9.1% index loss on day two becomes a 16.66 . . . % loss on day two. Both the index and the leveraged ETP are back to their initial values at the end day two. This is not coincidence. If the returns for the index are a % and b % for the two periods, then the levered return is $$(1+a)^{1.9129}(1+b)^{1.9129}=((1+a)(1+b))^{1.9129}$$

As such, the cumulative return of the leveraged fund is the index cumulative return to the 1.9129 power. Whether one is calculating the return for a single day or the cumulative levered return over a period of time, the conversion from the index return to the levered return is the same.

The power function above is part of a family of functions, f(), that satisfy certain conditions for mapping the index return to the levered return. To insure that the levered returns are unaffected by the timing or path for obtaining the index return, we specify that this function is the same regardless of whether the index return is calculated over a single day or cumulative over many days. Denoting one plus the daily return as x for the first day and y for the second day, this is equivalent to stating that the function satisfies the following constraint.

$$f(x)*f(y)=f(x*y)$$

and only power functions $$f(x)=x^c$$

satisfy this condition:
Since x is one plus the daily index return, r, the daily return of the leveraged ETP is $$r^*=(1+r)^c-1$$

To set a value for the exponent, c, we specifying a levered return, r'*, for a given index return, r' and calculate c as follows.

$$c=\ln(1+r'^*)/\ln(1+r')$$

where ln(x) denotes the natural logarithm of x.

In the example above, the specified levered return is 20% when the index return is 10%. In the formula, r'*=0.20 and r'=0.10, so c=1.9129. Other values for r' and r'* can be used to compute values for c corresponding to the 3-times leveraged ETP or different versions of a 2-times leveraged ETP.

Reverse ETPs can also be created using the same methodology. For instance, to set a return of 5% when the index loses 5%

$$c=\ln(1+0.05)/\ln(1-0.05)=-0.9512$$

The pattern of returns for the power function is implemented by applying different levels of leverage depending on the current intraday performance. This can, in effect, provide a similar result to delta hedging to replicate the returns from an option position. Similar to the delta hedge for a call option, the greater the gains, the greater the leverage applied and the greater the losses, the smaller the leverage.

The leverage ratio is derived from the power function which maps the index returns to the levered returns:

$$g(r)=(1+r)^c-1$$

The leverage ratio is the first derivative of the power function $$dg(r)/dr=c(1+r)^{c-1}$$

In FIG. 4, where c=1.9129, the leverage ratio appears as the dashed line 201' and the fixed leverage ratio is the dashed line 200'. For this example the leverage ratio is 1.9129 at the start of trading and decreases for losses and increases with gains as trading proceeds during the day. At the end of each trading day, the new NAV is struck and the leverage ratio is set at 1.9129 for the start of the next trading day.

Changing the leverage ratio provides a similar result to hedging an options position. In the case of options, the option has sensitivity to volatility built into the product and the dynamic hedge is a method to remove that volatility in the price of the option plus the hedge. For the power leveraged ETP, the dynamic leverage strategy removes the volatility imbedded in the fixed-leverage methodology.

The leveraged and reverse ETPs generated in according with the present invention can provide a number of advantages. They track the index in a predictable way over daily and cumulative time periods, and the returns for these reverse and leveraged ETPs are not sensitive to day-to-day reversals or the volatility of the underlying index.

As explained above, in accordance with the present invention, the task of using the leverage ratio in accordance with the present invention to track the underlying fund can either be actively implemented by the trader, or be implemented automatically by the computer. Generally speaking, in cases where a trader is actively implementing the ETP, the trader will need to monitor the market, and if the underlying ETP moves by a given percentage (let us say 1% up or down), then the trader will buy or sell the underlying ETP to match a target leverage ratio, $dg(r)/dr=c(1+r)^{c-1}$. For leveraged ETPs, as the market advances, the trader will need to buy more of the underlying ETP, and when the underlying ETP falls in value, the trader will need to sell a specified portion of the underlying ETP. For reverse leveraged ETPs, the trader will sell a portion of the underlying ETP when the value of the underlying ETP increases in value and will need to buy a portion as the underlying ETP declines in value. In each case, the minimum information needed by the trader is the leverage ratio combined with the return of the underlying ETP since the previous day's closing price for the underlying ETP. In this regard, the trader will buy/sell the underlying asset to match the leverage ratio.

The chart of FIG. 5 provides a simplified example of how a trader (or an automated computer program) could use the leverage ratio and the return of the underlying ETP to maintain a leveraged ETP over ticks ("t"), i.e., changes in the value of the underlying ETP, during a trading day. This example is for a 2 times leveraged ETP, but the same principles would apply to leveraged ETPs of different multiples, and to reverse ETPs. As explained above, for a 2 times leveraged ETP "c"=1.9129, and the leveraging ratio is $dg(r)/dr=1.9129(1+r)^{1.9129-1}$.

In FIG. 5, the first four columns on the left (labelled A-D) relate to the underlying ETP. Beginning from the left, the columns display the open price of the underlying ETP at tick "t"=(A(t)), the last price of the underlying ETP (B(t)), the return of the underlying ETP (C(t)=B(t)/A(t)), and the cumulative return for the underlying ETP for that day (D(t)=C(1)* C(t)). The next four columns (E-H) show the leverage applied over time (E(t)=1.9129*D(t-1)$^{1.9129-1}$), the levered return (F(t)=(C(t)-1)*E(t)+1), and the levered cumulative return (G(t)=(F(t)*F(t-1)), and the leveraged return ratio (H(t)=(G(t)-1)/(D(t)-1)). The last two columns show the power leverage (I(t)=D(t)$^{1.9129}$) and the ratio between the power leverage cumulative return and the variable leverage cumulative return: (J(t)=I(t)/G(t)).

It should be noted that the leverage only changes after the price has moved. When the underlying price is at 110, the system can't know if the price will go up or down, and doesn't know if it should increase or decrease the leverage at that time. As the system changes the leverage after the price has changed, the system is always attempting to react to a movement that has already happened. Another issue, of course, is how large a movement should trigger a change in leverage. This is, in essence, a tradeoff between size of tracking error relative to the theoretical return and the cost of doing additional transactions. If the hedge is changed for the smallest change in prices, then the result will be a very close approximation to a perfect delta hedge, but transaction costs will soar.

If the leverage is changed only after very large moves, then the result will be only a rough approximation of the perfect delta hedge, but transaction costs will be minimal. In the above example, movement of at least one dollar is required to trigger a change in leverage.

Figure 6:
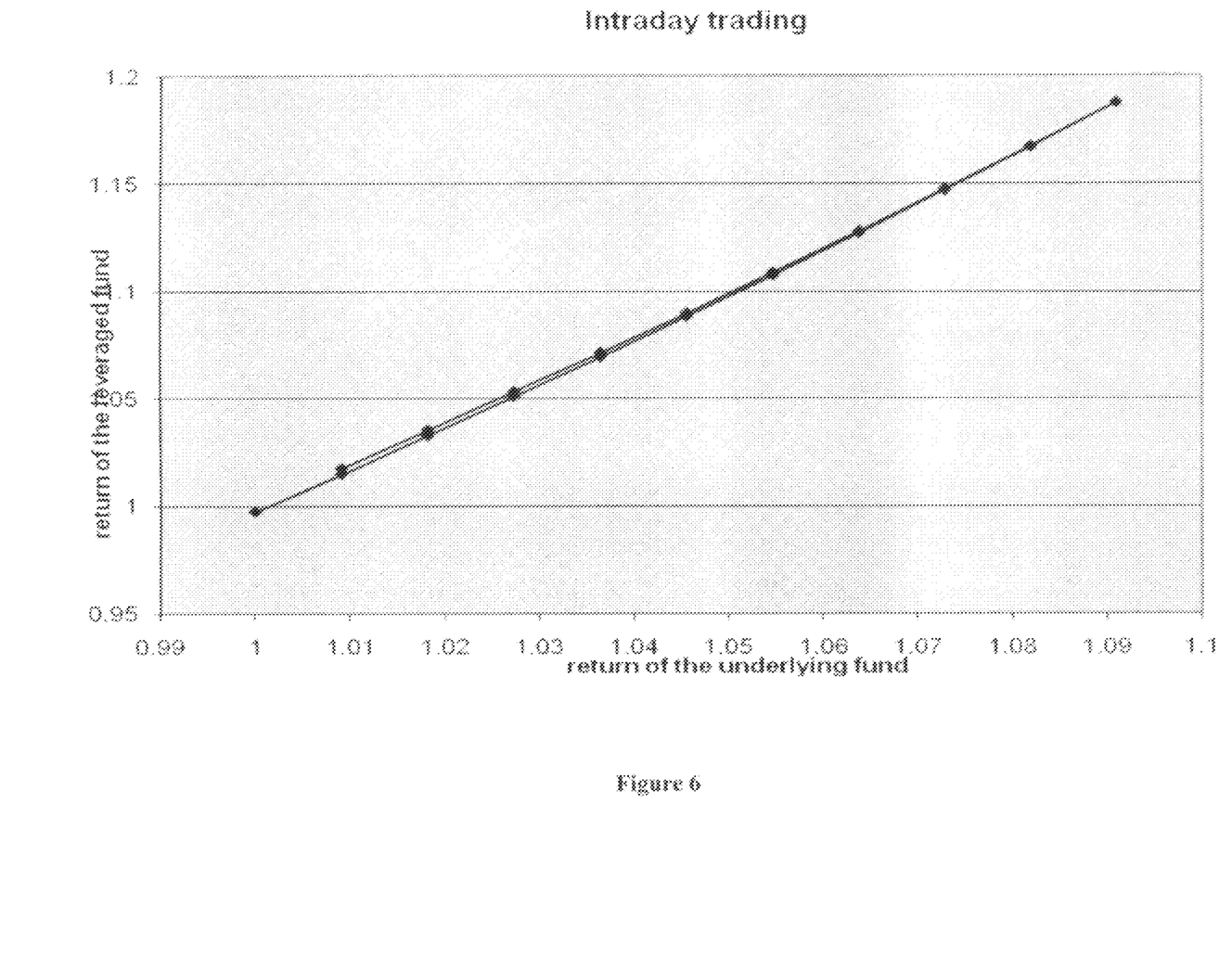
FIG. 6 is a graph that plots the cumulative return of the variable leveraged ETP of FIG. 5 against the cumulative return of the underlying ETP.

FIG. 6 shows the plots the cumulative return of the variable leveraged fund of FIG. 5 (G(t)) against the cumulative return of the underlying fund (D(t)) over the period from t=1 to t=20. The plotted line shows the return of the leveraged vs unlevered as the as the unlevered fund increases in value and then as it decreases in value. If the hedge were perfect, the line as the unlevered fund increased in value would be identical to the line when the unlevered fund decreased in value. The lines are slightly different due to the imperfection of the delta hedging strategy as implemented using discrete trades.

In order to track the performance of the underlying ETP, a user will buy or sell shares of the underlying ETP to maintain the leverage, which, in the case of FIG. 5, is dg(r)/dr=1.9129 $(1+r)^{1.9129-1}$. For example, At tick t=2, the share price of the underlying asset moves from 111 to 112, and the leverage has changed from 1.9129 to 1.9287691, and that provides a levered return of 1.01738. To achieve the leverage of 1.9287691, the user can buy 1.9287691−1.9129=0.0158691 shares of the underlying ETP at the price of $112/share.

At t=2, the leveraged cumulative return is 1.035068472, whereas the cumulative return according to the power function (underlying cumulative return)$^{1.9129}$ is slightly different, at 1.035068491. The main reason for the difference is the nature of the discrete trading that takes place to update the leverage after the market has moved. The leverage can only be updated once the price of the underlying has either moved higher or lower, but by that time, the leverage is already out of date.

Figure 7:
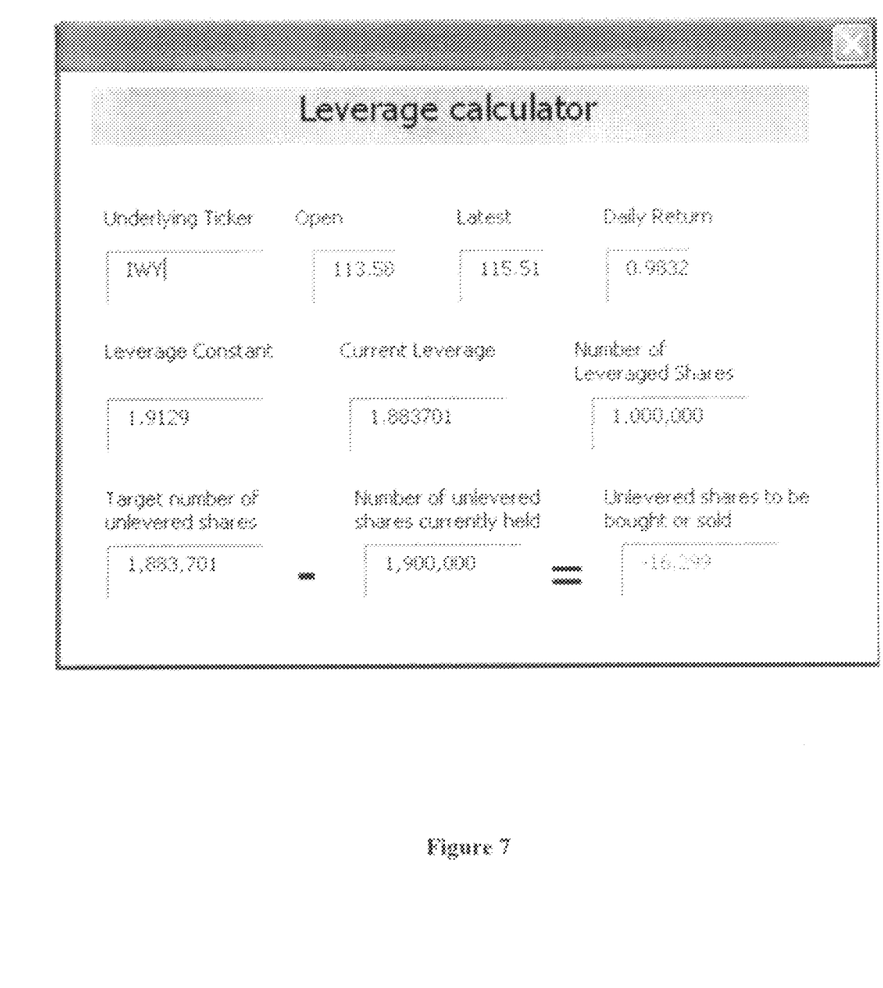
FIG. 7 is an exemplary graphical user interface that could be used in connection with the present invention.

FIG. 7 shows an exemplary graphical user interface (GUI) that could be generated by a computer program executing on a computer and displayed on a display screen to implement an embodiment of the present invention. This GUI allows a user to calculate how many shares of an underlying fund he or she would need to buy to maintain the current leverage. The user can input the symbol of the underlying fund ("underlying ticker"), and the computer will then display the open and latest price of the underlying fund, along with the cumulative underlying return ("daily return"). As one of skill in the art will appreciate, the computer can obtain this information from market data feeds in a conventional manner. The user specifies number of leveraged shares he currently owns and the desired leverage constant. Alternatively, the leverage constant can be preset in the system and/or the computer can retrieve the number of currently owned shares from a database. In either case, the computer will then calculate the current leverage, and the target number of underlying shares (unlevered shares), the number of unlevered shares currently held (i.e., (prior leverage)*(number of leveraged shares)), and the number of underlying shares to be bought or sold. In this regard, the "prior leverage" would be the leverage used for the last purchase of or sale of underlying shares. In this example, the prior leverage was 1.900000, and the user is instructed to sell 16,299 shares of the underlying fund IWY. The next time the share price of IWY changes, the "prior leverage" will be 1.883701. Trading could also be done using the constituents of the index or derivatives based on the index. In this case, the program would compute the number of shares of the either index constituents or the index derivative to buy or sell.

Although not illustrated in FIG. 7, the GUI could also include a BUY or SELL button which, when actuated, would transmit an buy or sell order to an exchange, ECN, or ATS on which the underlying fund IWY is traded. As computer networks and software for electronically trading stocks, funds, bonds, and commodities, are well known, the details of how orders are transmitted to an exchange to complete a sale will not be discussed herein.

In accordance with further embodiments of the present invention, non transitory computer readable media are provided, having stored thereon, computer executable process steps operable to control a computer to perform the steps described herein.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A computer implemented method for maintaining a leveraged or reverse exchange traded product, comprising:

electronically monitoring, with a computer, changes in value of a product sold on an exchange, Electronic Communication Network (ECN), or Alternative Trading System (ATS);

in response to said monitored changes in value during a trading day, calculating, with a computer, a target number of shares in the product and/or derivatives based on the price of the product required to provide a target return that is one of a multiple of a return of the product, a negative of the return of the product, or a negative multiple of the return of the product, the target number of shares changing as a function of the monitored changes in value of the product during the trading day;

buying or selling shares in the product to obtain the target number of shares;

wherein the step of calculating further comprises calculating a leverage ratio, wherein the leverage ratio is dg(r)/dr=c(1+r)$^{c-1}$, and wherein r is a current, cumulative return of the product during a current trading day, and c is a constant, and wherein the leverage ratio is equal to the number of underlying shares required to provide the target return with respect to one share of the product;

wherein c=ln(1+r'*)/ln(1+r'), and wherein r'* is the target return for a return, r', of the product, and ln(x) is the natural logarithm of x; and wherein, regardless of a timing of an investment in the leveraged or reverse exchange traded product and recent return history of the product, a forward looking return of the leveraged or reverse exchange traded product is fixed relative to the return of the product.

2. The method of claim 1, wherein the target return is two-times the return of the product, and c=1.9129.

3. The method of claim 1, wherein the target return is a negative of the return of the product, and c=−0.9512.

4. A computer implemented method for maintaining a leveraged or reverse exchange traded product, comprising:

electronically monitoring, with a computer, a change in value of a product sold on an exchange, Electronic Communication Network (ECN), or Alternative Trading System (ATS);

calculating, with a computer, a leverage ratio, wherein the leverage ratio is dg(r)/dr=c(1+r)$^{c-1}$, and wherein r is a current cumulative return of the product during a current trading day, and c is a constant, and wherein the leverage ratio is equal to the number of underlying shares required to provide the target return with respect to one share of the product;

wherein $c=\ln(1+r'^*)/\ln(1+r')$, and wherein $r'^*$ is the target return for a return, $r'$, of the product, and $\ln(x)$ is the natural logarithm of x; and wherein, regardless of a timing of an investment in the leveraged or reverse exchange traded product and recent return history of the product, a forward looking return of the leveraged or reverse exchange traded product is fixed relative to the return of the product.

5. The method of claim 4, further comprising displaying the leverage ratio to user on a display screen.

6. The method of claim 4, further comprising calculating, with a computer, a target number of shares in the product required to provide a target return that is one of a multiple of a return of the product, a negative of the return of the product, or a negative multiple of the return of the product, the target number of shares changing as a function of the monitored change in value of the product during a trading day, the target number of shares calculated as a function of the leverage ratio.

7. The method of claim 6, further comprising buying or selling shares in the product to obtain the target number of shares.

8. The method of claim 4, wherein the target return is two-times the return of the product, and c=1.9129.

9. The method of claim 4, wherein the target return is a negative of the return of the product, and c=−0.9512.

10. A computerized method for structuring leveraged and reverse exchange products comprising electronically monitoring, with a computer, a change in value of an underlying unlevered instrument;

generating a leveraged or reverse exchange traded product that provides a predictable return that is a well defined function of a return of the underlying unleveraged instrument that provides an investor with a fixed levered or inverse return relative to the return of the underlying instrument throughout a period of investment in the leveraged or reverse exchange traded product; and selling, using a computer, the leverage or reverse exchange traded product on an exchange, Electronic Communication Network (ECN), or Alternative Trading System (ATS);

wherein the step of generating further comprises calculating a leverage ratio, wherein the leverage ratio is $dg(r)/dr=c(1+r)^{c-1}$, and wherein r is a current, cumulative return of the underlying unleveraged instrument during a current trading day, and c is a constant, and wherein the leverage ratio is equal to the number of underlying shares required to provide the target return with respect to one share of the underlying unleveraged instrument;

wherein $c=\ln(1+r'^*)/\ln(1+r')$, and wherein $r'^*$ is the target return for a return, $r'$, of the underlying unleveraged instrument, and $\ln(x)$ is the natural logarithm of x; and wherein, regardless of a timing of an investment in the leveraged or reverse exchange traded product and recent return history of the underlying instrument, a forward looking return of the leveraged or reverse exchange traded product is fixed relative to the return of the underlying instrument.

11. The method of claim 10, wherein a relationship between the leveraged and reverse ETP and the underlying instrument is fixed and independent of the sequence of daily returns obtained by the underlying instrument as well as timing and volatility of the daily returns.

12. A computerized method for generating a leveraged or reverse exchange index comprising generating, using a computer a leveraged or reverse exchange traded index that provides a predictable return that is a well defined function of a return of an underlying unleveraged instrument that provides the investor with a fixed levered or inverse return relative to the return of the underlying instrument throughout a period of investment in the leveraged or reverse exchange traded index; and selling, using a computer, the leverage or reverse exchange traded product on an exchange , Electronic Communication Network (ECN), or Alternative Trading System (ATS), based on said index;

wherein the step of generating further comprises calculating a leverage ratio, wherein the leverage ratio is $dg(r)/dr=c(1+r)^{c-1}$, and wherein r is a current, cumulative return of the underlying unleveraged instrument during a current trading day, and c is a constant, and wherein the leverage ratio is equal to the number of underlying shares required to provide the target return with respect to one share of the underlying unleveraged instrument;

wherein $c=\ln(1+r'^*)/\ln(1+r')$, and wherein $r'^*$ is the target return for a return, $r'$, of the underlying unleveraged instrument, and $\ln(x)$ is the natural logarithm of x; and wherein, regardless of a timing of an investment in the leveraged or reverse exchange traded product and recent return history of the underlying instrument, a forward looking return of the leveraged or reverse exchange traded product is fixed relative to the return of the underlying instrument.

* * * * *